(12) United States Patent
Jones et al.

(10) Patent No.: US 7,720,814 B2
(45) Date of Patent: May 18, 2010

(54) REPOPULATING A DATABASE WITH DOCUMENT CONTENT

(75) Inventors: Brian M. Jones, Redmond, WA (US); Tristan A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 11/784,165

(22) Filed: Apr. 4, 2007

(65) Prior Publication Data

US 2008/0250052 A1 Oct. 9, 2008

(51) Int. Cl.
G06F 17/00 (2006.01)

(52) U.S. Cl. .................. 707/640; 707/695; 707/804; 715/209; 715/253

(58) Field of Classification Search .............. 707/3, 707/5, 101, 102; 705/1; 709/201, 203, 229; 715/205, 209, 249
See application file for complete search history.

(56) References Cited

U.S. PATENT DOCUMENTS

| | | | | |
|---|---|---|---|---|
| 5,267,155 A | | 11/1993 | Buchanan et al. | 715/210 |
| 5,457,792 A | | 10/1995 | Virgil et al. | 707/3 |
| 5,845,303 A | | 12/1998 | Templeman | 715/255 |
| 5,862,325 A | * | 1/1999 | Reed et al. | 709/201 |
| 6,154,753 A | | 11/2000 | McFarland | 715/221 |
| 6,209,004 B1 | | 3/2001 | Taylor | 715/236 |
| 6,473,794 B1 | * | 10/2002 | Guheen et al. | 709/223 |
| 6,632,251 B1 | | 10/2003 | Rutten et al. | 715/205 |
| 6,714,939 B2 | * | 3/2004 | Saldanha et al. | 707/102 |
| 6,961,776 B1 | * | 11/2005 | Buckingham et al. | 709/229 |
| 6,996,571 B2 | * | 2/2006 | McConnell | 707/101 |
| 7,107,264 B2 | * | 9/2006 | Lu | 707/3 |
| 2002/0077846 A1 | | 6/2002 | Bierbrauer et al. | 705/1 |
| 2002/0087600 A1 | * | 7/2002 | Newbold | 715/209 |
| 2002/0184401 A1 | * | 12/2002 | Kadel et al. | 709/315 |
| 2003/0018644 A1 | * | 1/2003 | Bala et al. | 707/100 |
| 2003/0140097 A1 | * | 7/2003 | Schloer | 709/203 |
| 2003/0145018 A1 | * | 7/2003 | Hitchcock et al. | 707/104.1 |
| 2004/0098284 A1 | | 5/2004 | Petito et al. | 705/1 |
| 2004/0153465 A1 | | 8/2004 | Singleton et al. | 707/100 |
| 2005/0154983 A1 | | 7/2005 | Hailey et al. | 715/234 |
| 2005/0235202 A1 | * | 10/2005 | Chen et al. | 715/249 |
| 2005/0278623 A1 | | 12/2005 | Dehlinger et al. | 715/243 |
| 2005/0289446 A1 | * | 12/2005 | Moncsko et al. | 715/205 |
| 2006/0020519 A1 | | 1/2006 | Schroeder et al. | 705/26 |
| 2006/0069989 A1 | | 3/2006 | Jones et al. | 715/273 |
| 2006/0173865 A1 | | 8/2006 | Fong | 707/100 |
| 2006/0190815 A1 | | 8/2006 | Jones et al. | 715/210 |
| 2006/0193008 A1 | | 8/2006 | Osaka et al. | 358/1.18 |

(Continued)

OTHER PUBLICATIONS

Evermore Software; "*EIOffice 2007*"; http://www.evermoresw.com/weben/product/integrated.jsp; 2006; 2 Pgs.

(Continued)

*Primary Examiner*—Shahid A Alam
(74) *Attorney, Agent, or Firm*—Merchant & Gould, P.C.

(57) ABSTRACT

Word processing documents that are created using content from a database are used to repopulate a database. The document includes content placeholders that link the content to locations within the database from which the content was retrieved. The appropriate content based on the changes made to the document is extracted from the document and is placed back within the database at the correct location. The database is repopulated such that the content within the database does not include all of the metadata required to produce the desired look and feel of a document that is generated using the content.

20 Claims, 3 Drawing Sheets

U.S. PATENT DOCUMENTS

| | | | |
|---|---|---|---|
| 2006/0195454 A1 | 8/2006 | Davis et al. | 707/100 |
| 2006/0253478 A1 | 11/2006 | Graham et al. | 707/100 |
| 2006/0259854 A1 | 11/2006 | Walker et al. | 715/234 |
| 2006/0271519 A1 | 11/2006 | Blackwood et al. | 707/3 |
| 2006/0288278 A1 | 12/2006 | Kobayashi | 715/209 |
| 2007/0033213 A1 | 2/2007 | Bezrukov et al. | 707/102 |
| 2007/0282616 A1* | 12/2007 | Brunswig et al. | 705/1 |
| 2008/0154873 A1* | 6/2008 | Redlich et al. | 707/5 |
| 2008/0250394 A1 | 10/2008 | Jones et al. | 717/123 |
| 2008/0288861 A1 | 11/2008 | Jones et al. | 715/253 |

OTHER PUBLICATIONS

Madhva, Sanjay Kumar; "*Generating a WordprocessingML Table from a Data Source*"; Open XML Developer.org; http://openxmldeveloper.org/articles/generatewordtable.aspx; May 24, 2006; 27 Pgs.

Mitchell, Scott; "*Generate Office Documents, Monitor Event Logs, and More*"; MSDN; http://msdn.microsoft.com/msdnmag/issues/06/06/Toolbox/default.aspx; Jun. 2006; 8 Pgs.

Adboe; "*Adobe Solutions for Document Generation*"; http://adobe.com/products/server/pdfs/document_generation_wp.pdf; 2003; 17 Pgs.

FitzGerald, et al.; "*Crystal Reports XI: Official Guilde*"; Sams, Nov. 2, 2006; proquest.safaribooksonline.com/0672329174; 58 Pgs.

* cited by examiner

REPOPULATING A DATABASE WITH DOCUMENT CONTENT

RELATED APPLICATIONS

U.S. patent applications Ser. No. 11/784,097, filed Apr. 4, 2007, entitled "GENERATING A WORD-PROCESSING DOCUMENT FROM DATABASE CONTENT" and Ser. No. 11/784,163, filed Apr. 4, 2007, entitled "SYNCHRONIZING EXTERNAL DOCUMENTATION WITH CODE DEVELOPMENT" assigned to the assignee of the present application, are related to the present application.

BACKGROUND

Data that is stored within a database system may be used in creating a word processing document for readability purposes. Repopulating the database with data from the word processing document based on the changes made within the document, however, is difficult. One method that is used to repopulate the database with data from the document is to store the entire document within the database as a single entity in the format produced by the word processing document. Using this method the entire data is stored in the word processing format within a single location within the database thereby incurring a substantial storage cost.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Word processing documents that are created using content from a database are used to repopulate that database. The documents includes content placeholders that identify the locations within the database from which the content was retrieved. When the database is repopulated, the appropriate content is extracted from the document and is placed back within the database at the correct location. The database is repopulated such that the content within the database does not need to include all of the metadata required to produce the desired look and feel of a document that is generated using the content.

DETAILED DESCRIPTION

Figure 1:
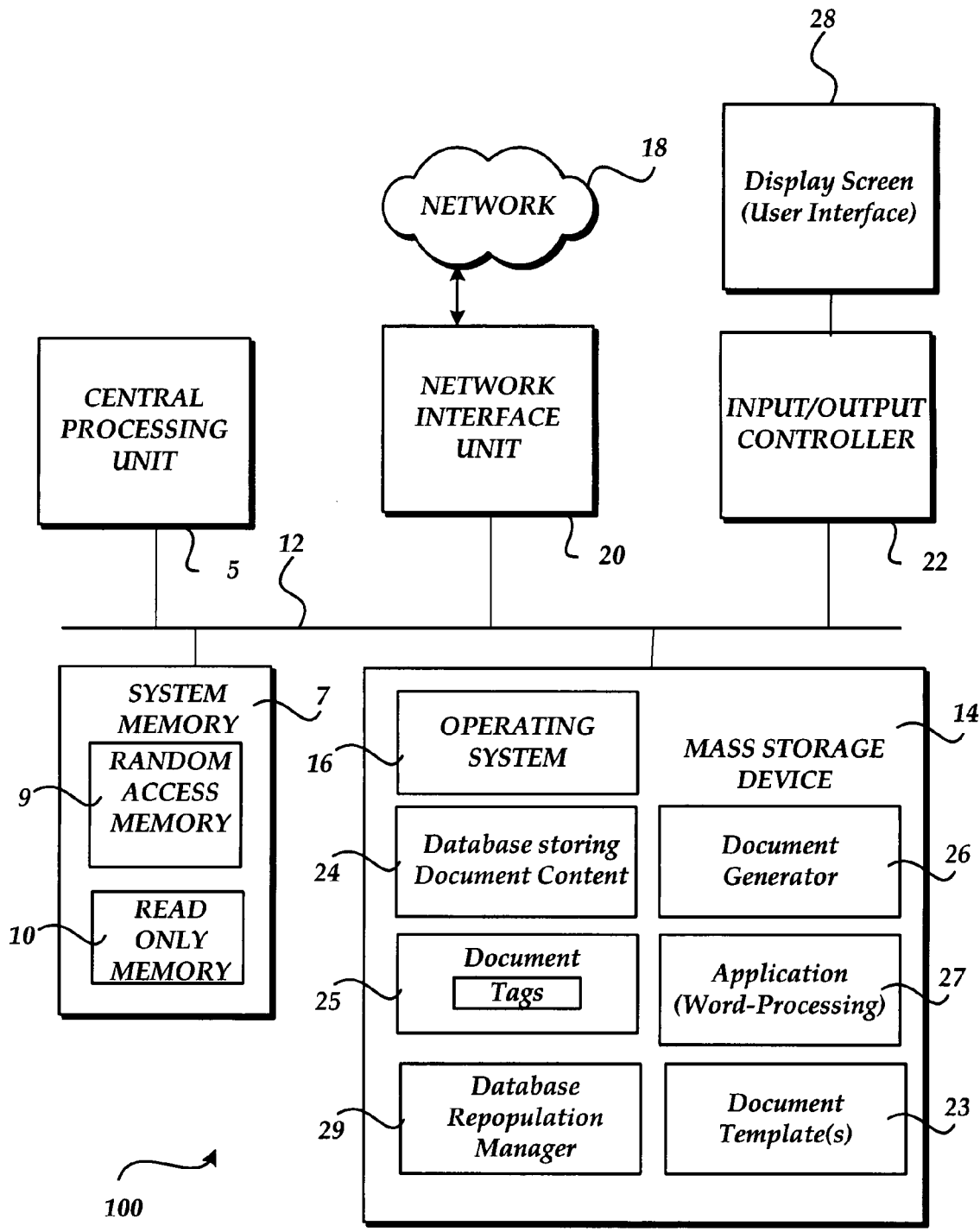
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, database(s) 24, document(s) 25, database repopulation manager 29, document generator 26, application program(s) 27, document template 23, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 23 having a user interface.

As mentioned briefly above, a number of program modules and data files may be stored in the mass storage device 14 and RAM 9 of the computer 100, including an operating system 16 suitable for controlling the operation of a networked personal computer, such as the WINDOWS VISTA operating system from MICROSOFT CORPORATION of Redmond, Wash. The mass storage device 14 and RAM 9 may also store one or more program modules. In particular, the mass storage device 14 and the RAM 9 may store database 24. Database 24 may be configured to store many different types of data. For example, the data may relate to elements of an API, records relating to a product, and the like. Generally, database 24 contains any type of data which are used to create a document. While database 24 is shown on computer 100, database 24 may be stored within in any data store, such as on a data store on network 18. Additionally, more than one database may be configured to store data that is used within a document.

The document generator 26 is operative to create document 25 using content from database 24. For example, a user may select one or more sections of a document(s) to be created from database 24 utilizing user interface 28. Database 24 is configured to store multiple disparate regions of rich content that can contain standard word processing content (pictures, etc.) without requiring each piece of content to define all of the necessary document metadata required to create a document. The look and feel of the document is defined externally from the data in the database such that a consistent look and feel may be applied to the retrieved data. For instance, one or more document templates 23 may be defined to produce a consistent look and feel for the documents generated. When a document is requested to be viewed and/or edited, the appropriate content from the database is automatically retrieved and placed within the document according to the defined look and feel. The document 25 includes content placeholders, such as tags, or some other identifying indicia, that identifies the location within the database from where the content was retrieved.

Database repopulation manager 29 is configured to repopulate database 24 with content from document 25. While document 25 is illustrated within mass storage device 14, document 25 may be obtained from many different locations. For example, document 25 may be received from a user or store on a network, such as network 18 or some other network. Generally, document 25 may be obtained from any source. The content used in repopulating database 24 is the content that was obtained from database 24 in generating document 25. The operation of database repopulation manager 29 will be explained in more detail below. Generally, the content extracted from the document is placed back into the appropriate location of database 24. For example, if a piece of content came from row 1, column 1 of the database then the data is placed back to that location within the database.

According to one embodiment, user interface 28 may be used in determining the content to place back within database 24. For instance, more than one version of a document may be created using the same content. In this situation, a user may utilize user interface 28 to determine which version they would like to use to repopulate database 24. Additionally, user interface 28 may be used to show the user the changes that were made to the data before accepting the changes and repopulating database 24 with the content.

Document template(s) 23 defines the look and feel of document 25 and are used to define document settings for document content. The templates may be used to include settings such as fonts, page layout, header/footer information, special formatting, styles and the like. In this way, the document settings do not need to be included within the data of the database 24. Templates allow consistency between documents that are generated by document generator 26. Any method of storing document settings, however, may be used to define the structure of document 25. For example, a list may be maintained within mass storage device 14 that contains the document settings and/or the settings may be contained within the database.

Although database repopulation manager 29 is shown as a separate application, it may be included directly within an application program 27 or at some other location. The operation of documentation repopulation manager 29 will be described in more detail below.

Figure 2:
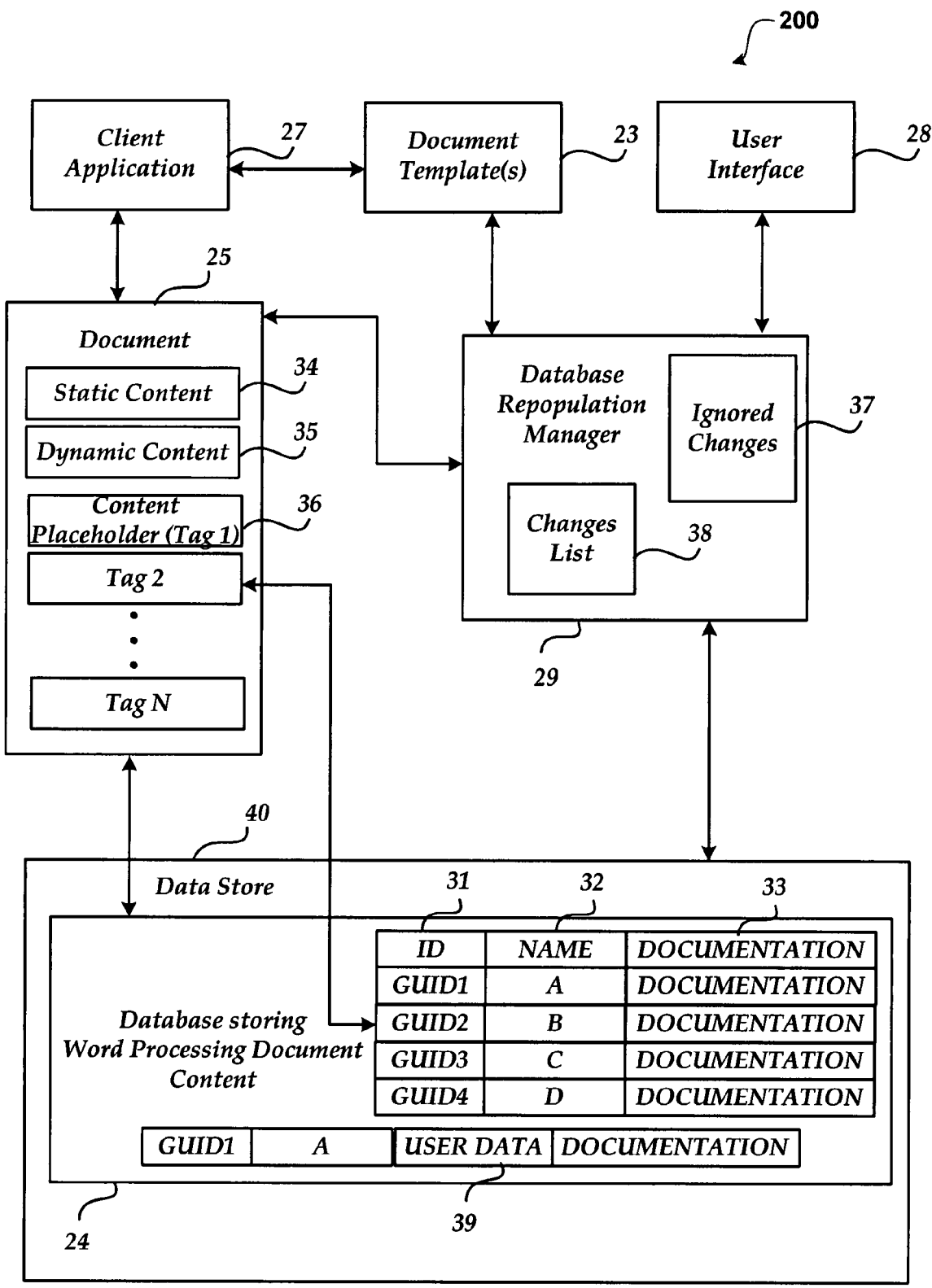
FIG. 2 shows a database repopulation system for repopulating a database using content from a document.

FIG. 2 shows a database repopulation system 200 for repopulating a database using content from a document. As illustrated, database repopulation system 200 includes database repopulation manager 29, data store 40 containing database 24, document 25, client application 27, document template(s) 23, and user interface 28. System 200 is directed at extracting content from document 25 and placing the extracted content into the correct location of database 24. The content extracted from the document typically includes rich content that contains standard word processing content (text, tables, pictures, etc.). The content that is used to repopulate the database, however, is not required to include all of the necessary document metadata that was used in defining the look and feel of the document. In this way, the amount of data that is stored within database is greatly reduced.

Client application 27 may be used to view and edit the document without affecting any of the pieces of the data stored within database 24. Client application 27 may use one or more document templates 23 to define the structure of document 25. The templates may define the styles, numbering, and the like that are used when generating and displaying the document. The template(s) 23 also may be used to define the location in which the constituent parts of the assembled document appear within the overall document. More than one document may be created using the same content from database 24.

Database 24 may contain one or more fields, such as documentation field 33, that may be edited by a user and included within document 25. More or less fields may be contained within database 24. For example, a user data field 39 may be included that may be edited. According to one embodiment, each row of the database 24 is uniquely identified such that the row can be identified even when an identifying characteristic, such as the name, of an element 32 within the database changes. For example, in XML elements, even when the typical identifying characteristics of those elements change (e.g., their names, content models, etc.) the element can remain associated with the document 25 using content placeholders (tags) 36. In order to uniquely identify each row of the database, each row of the database 24 is annotated with a unique ID. For example, each row may be identified by a separate unique GUID (globally unique identifier) 31.

Document 25 may take many different forms such as a single file, multiple files and the like. The document could be in the form of MICROSOFT WORD files or some other document format. According to one embodiment, document 25 includes static content 34 and dynamic content 35. Static content 34 is content is content that does not change, and as such, is not used in repopulating database 24. Dynamic content 35 is content that may change and is the content that is used in repopulating database 24. Generally, any content that may change within document 25 and came from database 24 is used to repopulate database 24. The location for dynamic content 35 may be defined within a template as a content placeholder 36 for a specific piece of information that is obtained from a specific row in the database. Part of the dynamic content that is obtained from the document is a fragment for the rich content item(s). As discussed above, the content retrieved from database 24 does not include all the information needed to express them in a generated document.

When these rich content items are inserted into document 25, however, they are valid against the schemas for the open document format since they are fragments of that greater whole.

Document 25 includes content placeholders 36, such as a tags, that identify the location of the content retrieved from database 24. According to one embodiment, the tags 36 are placed around each piece of content within document 25. The content placeholders 36 identify a specific location within database 24 from which the content was retrieved and include adequate metadata to uniquely associate each piece of content with a unique record in database 24. According to one embodiment, the content placeholders 36 include the appropriate unique identifier 31 that is associated with a particular row in the database as described above. In this way, a direct link is provided between content within document 25 and the location of that content within database 24. For example, document 25 include tags 36 that specifies the identifier (i.e. the GUID) that identifies which particular row of the database the content is associated with. The content placeholders 36 may take many different forms. For example, when the document is stored as XML, the tag may be an XML tag that is placed near and/or around the retrieved content from database 24. Any method of tagging the content items, however, may be used. The GUIDs 31 associated with each row provide a permanent link from the row in the database to document 25. Based on the information stored in these content placeholders, along with the availability of the specification for the word processing document format defining the document, the content items may be extracted from document 25.

Database repopulation manager 29 is configured to receive input from user interface 28, database 24, and document 25 in determining the content to update within database 24. The processing of document 25 by database repopulation manager 29 may be configured to determine any differences between content from document 25 and the corresponding content within database 24. For example, content that has not changed within document 25 does not need to be updated within database 24. In order to determine content that has been changed, client application 27 may provide an indication of what content within document 25 has changed and/or a difference program may be used to determine the changes. Database repopulation manager 29 may also be configured to ignore changes that are defined as ignored changes 37. Changes to content within document 25 that are defined as ignored changes are not used to repopulate the database. For example, a change to the formatting of a document may be considered an ignored change that does not need to be placed back into the database. Similarly, a change to a particular element may be considered an ignored change. According to one embodiment, a list of the ignored changes 37 is maintained on the system. Other methods may also be used. For example, a list of changes to include within changes list 38 may be maintained. The pieces of content that have been changed and were not ignored are placed in changes list 38. More than one document may be examined for content to include in changes list 38. For example, there could be any number of representations for the data. In this example, each of the changes could be included within changes list 38 and resolved using user interface 28 or an automatic method.

User interface 28 is configured to display information related to document 25 and content within database 24. User interface 28 may be used to provide a user with a display of the content before any changes were made to the content as well as provide a display of content after changes are made to the content. In this way, a user may decide whether or not to repopulate the database 24 with the changed content in changes list 38 or maintain the original content. The user interface 28 may be used to highlight the differences between each of the alternatives. User interface 28 may also be used to selectively choose which content to repopulate within database 24. Generally, user interface 28 may be used to display any number of presentations that use the same content from database 24. For example, four documents may be created using content from database 24. The system may also be configured to make some of these choices automatically. For example, document content that is changed may always be taken over existing database content.

The content extracted from document 25 may be checked to ensure that it can be inserted within database 24 without causing problems when the content is extracted in the generation of another document.

In response to any predetermined options, and the selections of content to repopulate database 24 received from user interface 28, database repopulation manager 29 repopulates the database 24. In order to repopulate the database, the user interface selections received from the user are translated into a database command (e.g. a SQL INSERT statement) in order to place the content within the appropriate sections of the database 24.

Figure 3:
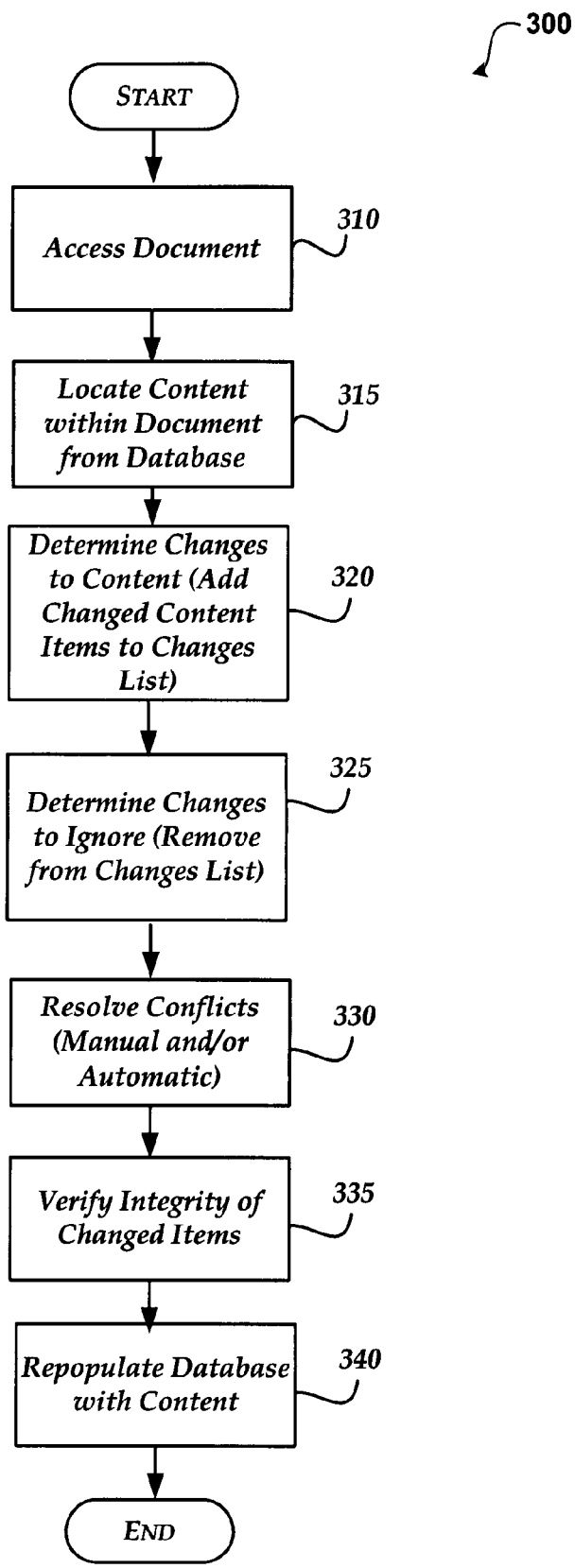
FIG. 3 shows an illustrative process for repopulating content within a database from document content.

Referring now to FIG. 3, an illustrative process for repopulating content within a database from document content is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where the document used to repopulate content within the database is accessed. According to one embodiment, the document is a word processing document. The document, however, may any type of document that was created using content from a database.

Moving to operation 315, the content within the document that was obtained from a database is located. As discussed above, each of the pieces of content within the document that were retrieved from the database are marked by a content placeholder, such as a tag, that provides the location of the content within the database. For example, each of the tags within the document may include a unique ID that corresponds to a particular location within the database.

Flowing to operation 320, each piece of content within the document that originated from database 24 is examined to determine whether or not a change has been made to the content. Any pieces of content which are identical between the document and the database are not changed and the content is not repopulated. If a difference is detected, then this piece of content is added to a changes list. As discussed above, this comparison is facilitated by the metadata in the content placeholders that identifies the location of the data within the database to which the comparison shall take place.

Moving to operation 325, each of the changed content items are examined to determine whether or not the change to the content should be ignored. The definition of a change that should be ignored may be provided by a user and/or based on the application configuration. According to one embodiment, a list of changes to be ignored is maintained on the system. For example, a change to the formatting of content may be considered a change to ignore and as such does not need to be placed back into the database. Similarly, a change to a particular element type may be considered a change to ignore. If a change to a piece of content is considered to be a change to ignore then that item is removed from the changes list.

Flowing to operation 330, the changes to the content are resolved. The conflicts may be resolved manually/automatically or using some combination of manual and automatic resolution. For example, a user interface may be used to show a user the different alternatives for the pieces of content. In this case the user interface can highlight where each option is different. According to one embodiment, a user selects the changes that they would like propagated back to the database. Other methods may also be used. For example, a predefined list may be used to automatically resolve the conflicts. According to another embodiment, the most recently updated piece of content may be used to repopulate the database.

Moving to operation 335, the integrity of the changed content is verified against the database. The pieces of content that remain on the change list are examined to make sure that changing the content within the database does not result in a conflict with another piece of content within the database.

Flowing to operation 340, the database is repopulated with the content. Each of the pieces of content is placed within the appropriate location of the database. Once the content is repopulated within database 24, document 25 may be removed from the system as another document may be created from database 24.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for repopulating a database with content from a document, comprising:
   accessing a document that includes content retrieved from a database; wherein the document is generated using the content retrieved from the database and wherein a layout and formatting for the content within the document is defined externally from the database content;
   locating the content within the document that was retrieved from the database; wherein the content within the document is associated with a location in the database; and
   repopulating the database with the content from the document.

2. The method of claim 1, further comprising determining when a change to the content retrieved from the database has been made within the document.

3. The method of claim 2, further comprising determining when a change to the content retrieved from the database is considered a change to ignore.

4. The method of claim 3, wherein repopulating the database with the content from the document, comprises excluding the content that has not changed and the changed content that consists of changes to be ignored.

5. The method of claim 3, wherein locating the content within the document that was retrieved from the database comprises locating content placeholders within the document that identify the content retrieved from the database.

6. The method of claim 5, wherein the content placeholders provide a link to a location within the database from which the content was retrieved.

7. The method of claim 6, wherein the content placeholders include a unique identifier that identify a row within the database.

8. The method of claim 2, further comprising verifying the integrity of the content before repopulating the database with the content from the document.

9. The method of claim 1, further comprising utilizing a user interface to show changes to the content within the document and receiving a determination through the user interface whether the changes to the content should be used in repopulating the database.

10. A computer-readable storage medium having computer-executable instructions for repopulating a database with content from a document, the instructions comprising:
    accessing a document that includes pieces of content retrieved from a database; wherein the document is generated using the pieces of content retrieved from the database and wherein a layout and formatting for content within the document is defined externally from the database content;
    locating the pieces of content within the document that were retrieved from the database;
    identifying a location within the database for each of the pieces of content that was retrieved from the database; and
    repopulating the database at the identified locations with the pieces of content from the document.

11. The computer-readable medium of claim 10, further comprising maintaining a changes list that identifies the pieces of content that has changed within the document since being retrieved from the database.

12. The computer-readable medium of claim 11, wherein maintaining the changes list, comprises excluding the pieces of content that are considered a change to be ignored.

13. The computer-readable medium of claim 10, wherein locating the pieces of content within the document that were retrieved from the database and identifying the locations within the database for each of the pieces of content that was retrieved from the database comprises locating content placeholders within the document that identify the content retrieved from a specific location within the database.

14. The computer-readable medium of claim 13, wherein the content placeholders include a unique identifier that identify a row within the database.

15. The computer-readable medium of claim 10, further comprising showing the pieces of content included within the changes list and determining for each of the shown pieces of content whether the piece of content should be used in repopulating the database.

16. A system for repopulating a database with content from a document, comprising:
    a processor and a computer-readable storage medium;
    an operating environment stored on the computer-readable storage medium and executing on the processor;
    a user interface that is configured to display the content from the document;
    a database having rows and columns; wherein the database includes pieces of content that is included within the document; wherein the pieces of content within the database include rich content but does not include all of the metadata used in generating the document;

a document including a piece of content from the database;
wherein the document is generated using the pieces of content retrieved from the database and wherein a layout and formatting for the content within the document is defined externally from the database content; and
a database repopulation manager that is configured to:
access the document;
locate the piece of content within the document that was retrieved from the database;
identify a location within the database from where the piece of content was retrieved; and
repopulate the database at the identified location with the piece of content.

17. The system of claim 16, wherein the database repopulation manager is further configured to determine when a change has been made to the piece of content since being retrieved from the database.

18. The system of claim 17, wherein the database repopulation manager is further configured to ignore the piece of content when repopulating the database when the change to the piece of content is considered a change to be ignored.

19. The system of claim 16, wherein the database repopulation manager is configured to locate a content placeholder within the document that identifies the piece of content retrieved from a specific location within the database.

20. The system of claim 16, wherein the user interface is further configured to receive a selection indicating whether to repopulate the database with the piece of content.

* * * * *